(12) United States Patent
Ramasamy et al.

(10) Patent No.: US 7,441,997 B2
(45) Date of Patent: *Oct. 28, 2008

(54) BREAK AWAY FASTENING SYSTEM

(75) Inventors: Sivakumar Ramasamy, Utica, MI (US); Mark H. Delcourt, Emmett, MI (US); Edward D. Murphy, Sparks, MD (US); Leo R. Clor, Huntington, IN (US)

(73) Assignee: Newfrey LLC, Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/698,961

(22) Filed: Oct. 31, 2003

(65) Prior Publication Data

US 2004/0120788 A1 Jun. 24, 2004

Related U.S. Application Data

(63) Continuation of application No. PCT/US03/20836, filed on Jul. 3, 2003.

(60) Provisional application No. 60/420,951, filed on Oct. 24, 2002, provisional application No. 60/416,614, filed on Oct. 7, 2002.

(51) Int. Cl.
*F16B 37/06* (2006.01)

(52) U.S. Cl. ...................................... 411/171

(58) Field of Classification Search ................ 411/171, 411/107; 219/107, 98, 99
See application file for complete search history.

(56) References Cited

U.S. PATENT DOCUMENTS

| 1,883,897 A | 10/1932 | Giles |
| 1,982,098 A | 11/1934 | Hartmann |
| 2,054,245 A | 9/1936 | Cummins |
| 2,167,285 A | 7/1939 | Smith |
| 2,201,067 A | 5/1940 | Whitmer |
| 2,202,405 A | 5/1940 | Smith |
| 2,413,370 A | 12/1946 | Palmer |
| 2,583,868 A * | 1/1952 | Thaddeus .................... 219/107 |
| 2,595,830 A | 5/1952 | Demboske |
| 2,707,507 A | 5/1955 | Tripp et al. |
| 2,708,129 A | 5/1955 | Kelemen et al. |
| 2,760,797 A | 8/1956 | Woodling |
| 2,858,414 A | 10/1958 | Dash |
| 2,878,363 A | 3/1959 | Shoup et al. |

(Continued)

FOREIGN PATENT DOCUMENTS

DE 3728219 3/1989

(Continued)

OTHER PUBLICATIONS

T. W. Clyne et al., "Development of a New Ultra-light Metallic Sheet Material", Jan. 2002, Research Proposal for Cambridge-MIT Institute.*
Corus Hylite(R), "Automotive Applications" Presentation/Proposal.*
http://www.corusgroup-hylite.com website, Mar. 2002.*
W.A. Stanley, Resistance Welding, Designing, Tooling, and Applications, 1950, 4 pgs.

*Primary Examiner*—Flemming Saether
(74) *Attorney, Agent, or Firm*—Harness, Dickey & Pierce, P.L.C.

(57) ABSTRACT

A fastening system is providing, the fastening system has a weld stud having an annular weldment portion and a fracturable nut. The fracturable nut and stud construction is configured to fail under torsional load prior to the structural parts failure.

11 Claims, 5 Drawing Sheets

U.S. PATENT DOCUMENTS

| | | | |
|---|---|---|---|
| 2,909,206 A | | 10/1959 | Johnson |
| 2,936,806 A | | 5/1960 | Harper |
| 3,094,607 A | | 6/1963 | Flynn et al. |
| 3,140,738 A | | 7/1964 | Johnson |
| 3,279,517 A | * | 10/1966 | Lewis .................. 411/171 |
| 3,424,064 A | | 1/1969 | Valentine |
| 3,435,871 A | * | 4/1969 | Johnson ............... 411/171 |
| 3,481,634 A | | 12/1969 | Rondeau |
| 3,671,710 A | | 6/1972 | Coombs |
| 3,714,859 A | | 2/1973 | Tupper |
| 3,760,143 A | | 9/1973 | Rondeau et al. |
| 3,905,173 A | | 9/1975 | Gerken |
| 4,012,885 A | | 3/1977 | King, Jr. |
| 4,121,495 A | | 10/1978 | Malo et al. |
| 4,130,751 A | | 12/1978 | Gordon |
| 4,228,722 A | | 10/1980 | Kazino |
| 4,263,831 A | | 4/1981 | Smith |
| 4,326,825 A | | 4/1982 | Volkmann et al. |
| 4,409,460 A | | 10/1983 | Nishii et al. |
| 4,684,304 A | | 8/1987 | Franks |
| 4,689,958 A | * | 9/1987 | Arino et al. ............. 60/547.1 |
| 4,799,842 A | * | 1/1989 | Kreider et al. ........... 411/171 |
| 4,850,772 A | | 7/1989 | Jenkins |
| 5,004,366 A | | 4/1991 | Simmons |
| 5,054,980 A | | 10/1991 | Bidefeld |
| 5,326,208 A | * | 7/1994 | Werner ................. 411/437 |
| 5,393,164 A | | 2/1995 | Renner et al. |
| 5,461,209 A | | 10/1995 | Yamada et al. |
| 5,474,408 A | | 12/1995 | Dinitz et al. |
| 5,493,833 A | * | 2/1996 | Irimies .................. 52/336 |
| 5,508,488 A | | 4/1996 | Aoyama et al. |
| 5,579,986 A | * | 12/1996 | Sherry et al. ............ 228/175 |
| 5,596,845 A | | 1/1997 | Strizki |
| 5,618,491 A | | 4/1997 | Kurup et al. |
| 5,685,680 A | | 11/1997 | Duffy et al. |
| 5,713,705 A | * | 2/1998 | Grunbichler ............... 411/5 |
| 5,713,706 A | * | 2/1998 | Lozano ................. 411/171 |
| 5,727,810 A | * | 3/1998 | Elqadah et al. .......... 280/728.2 |
| 5,987,957 A | | 11/1999 | Foeller et al. |
| 6,056,471 A | | 5/2000 | Dinitz |
| 6,071,051 A | | 6/2000 | Reed |
| 6,308,927 B1 | | 10/2001 | Leahy |
| 6,357,110 B1 | * | 3/2002 | Shipp et al. ............... 29/825 |
| 6,607,339 B1 | | 8/2003 | Mangapora |
| 6,637,095 B2 | | 10/2003 | Stumpf et al. |
| 6,755,601 B2 | * | 6/2004 | Ohta ................... 411/171 |
| 6,818,851 B2 | * | 11/2004 | Ramasamy et al. ......... 219/98 |
| 6,860,687 B1 | | 3/2005 | Schmitt et al. |
| 2002/0030037 A1 | | 3/2002 | Sichtermann et al. |
| 2003/0147716 A1 | | 8/2003 | Nagawa et al. |
| 2003/0175092 A1 | * | 9/2003 | Ohta ................... 411/171 |
| 2004/0213634 A1 | * | 10/2004 | Kortmann et al. ........ 403/408.1 |
| 2005/0008427 A1 | * | 1/2005 | Huber et al. ............... 403/2 |

FOREIGN PATENT DOCUMENTS

| | | | |
|---|---|---|---|
| DE | 4024042 | | 10/1991 |
| DE | 4222664 A1 | * | 1/1994 |
| DE | 4417397 | | 11/1995 |
| DE | 4432550 C1 | * | 11/1995 |
| DE | 29610640 | | 6/1996 |
| DE | 19637935 | | 4/1998 |
| DE | 19925628 | | 6/1999 |
| DE | 19811532 | | 9/1999 |
| DE | 19922679 A1 | * | 11/2000 |
| EP | 1060822 A2 | * | 6/2000 |
| EP | 1060826 | | 6/2000 |
| EP | 1116890 A1 | | 7/2001 |
| EP | 1202616 A1 | | 5/2002 |
| EP | 1264656 A1 | * | 12/2002 |
| GB | 1395632 | * | 5/1975 |
| GB | 2065011 A | | 6/1981 |
| GB | 2065011 A | * | 6/1981 |
| GB | 2153948 A | | 8/1985 |
| JP | 06091377 | * | 9/1992 |
| JP | 05023857 | * | 2/1993 |
| JP | 08243762 | * | 9/1996 |
| JP | 2001105142 | * | 4/2001 |
| WO | WO 97/35684 | | 10/1997 |
| WO | WO 01/76811 A1 | | 10/2001 |
| WO | WO 03/004883 A1 | * | 1/2003 |
| WO | WO 03/022504 A2 | * | 3/2003 |
| WO | WO 03/042554 A1 | * | 5/2003 |

* cited by examiner

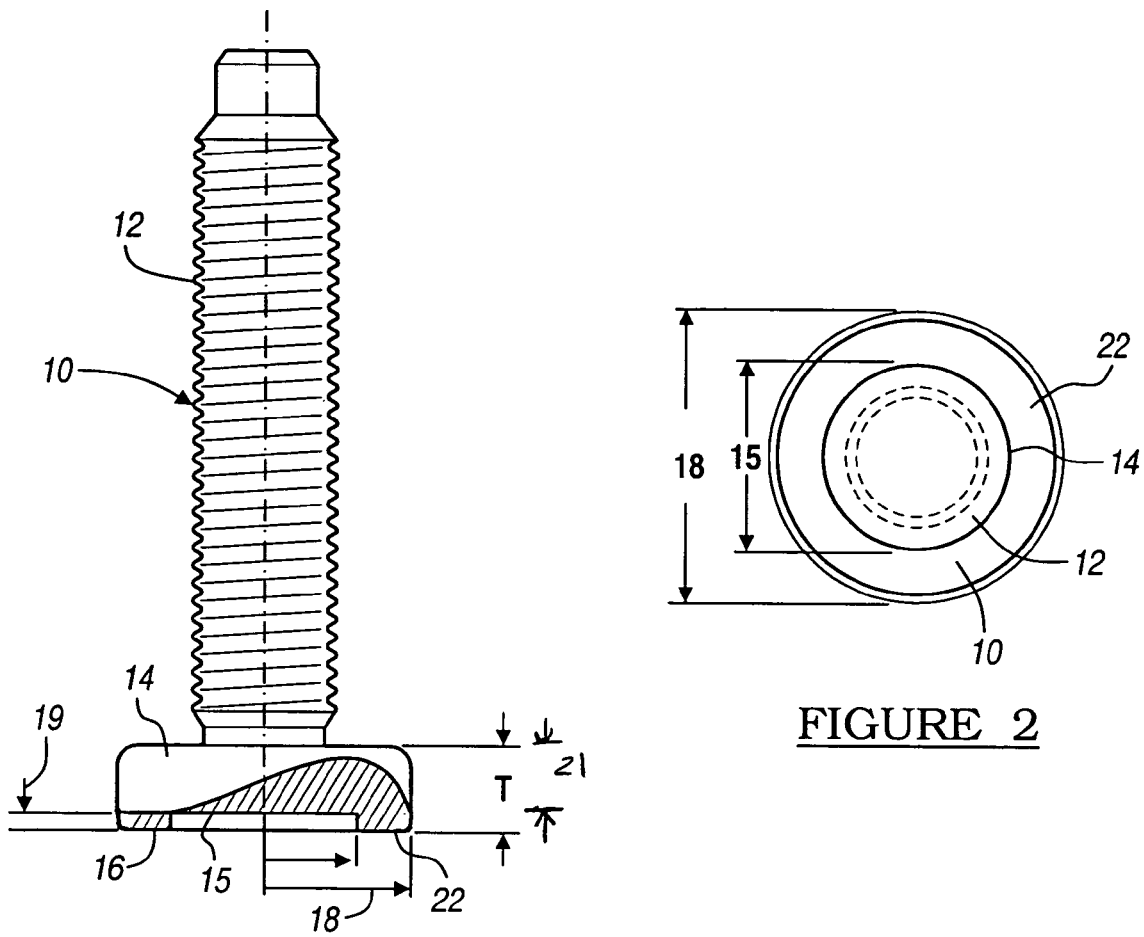
FIGURE 1
FIGURE 2
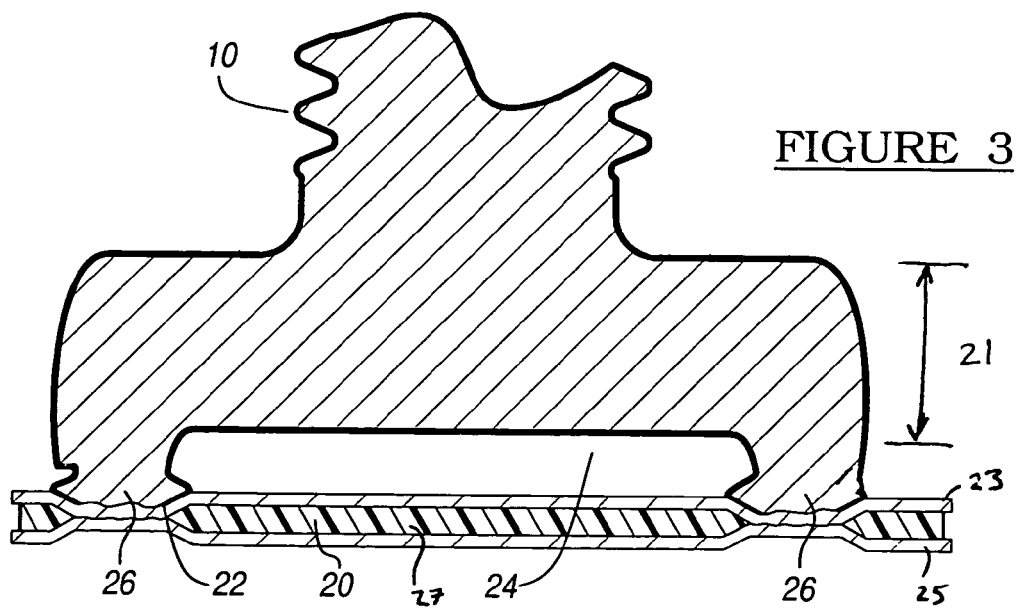
FIGURE 3

BREAK AWAY FASTENING SYSTEM

This application is a continuation application of PCT International Application PCT/US03/20836 filed on Jul. 3, 2003 which claims the benefit of U.S. Provisional Application No. 60/416,614 filed on Oct. 7, 2002 and U.S. Provisional Application No. 60/420,951, filed on Oct. 24, 2002. The disclosures of the above applications are incorporated herein by reference.

FIELD OF THE INVENTION

The present invention relates to a fastening system for fastening a member to a structural metal part and, more particularly, for fastening a member to sheet metal. A threaded metal stud having an annular welding surface is fastened to the structural part in short-time arc welding, and a fracturable lock nut is screwed onto the stud to fasten the member to the structural part.

BACKGROUND OF THE INVENTION

Metallic weld studs are typically solid, non-compressible bodies which are formed by standard fastener stamping methods such as being cold headed from rod materials. Such weld studs are welded to a component surface by using a known welding device which provides energy through the weld stud to melt both a circular sacrificial weldment element, as well as a portion of the component base material. The weld stud is fixed to the base material due to the commingling and cooling of the liquefied metals. The welding device, in particular a weld gun, grasps the weld stud using clamping jaws in a region between a shoulder of the stud and the end of the face to be welded. Each weld stud is placed into the mouth of weld gun one at a time immediately prior to welding. The size, weight, and configuration of these studs prevent their use in blow fed weld guns.

Increased fuel economy demands within transportation industries have led to the use of thinner and thinner gauge materials. In particular, metallic composite materials and particularly aluminum composite materials with a polymer core have effectively been used as surface or skin materials for various structures. These very thin metallic laminates are typically coupled or fastened to a support structure by being fastened to the support structure on one side of the laminate. To this end, it is known to fasten an ordinary weld stud to the laminate structure to facilitate the coupling of the stud to the structure.

Traditionally, weld studs burn through at least the first layer of the thin laminate material. The weldment provides a stress riser which significantly weakens the strength of weld stud laminate interface. Repeated loading of the weld stud leads to plastic deformation in the coupling interface and premature failure of the stud to laminate interface.

Known studs have a head and shank connected to the head. The head of a stud is welded to the sheet metal of a vehicle body. The welding operation takes place according to the known method of drawn-arc welding. In this method, the stud is brought into contact with the sheet metal, the welding current is then switched on and the stud is drawn off the sheet metal so that an arc is formed between the stud and the sheet metal. While the arc is burning, part of the stud head and part of the sheet metal melt. When a sufficient amount of molten metal has been generated, the stud is driven into the melting. The welding operation as such can be influenced by several parameters. The influence of the individual parameters has various effects on susceptibility to error when welding studs with the drawn-arc method.

For the purpose of arc initiation, the head geometry of the stud must be designed accordingly. In this context, studs having a head with a conical tip are known in the art. Studs with a substantially flat head/front end are further known, with an ignition tip formed in the center of the front end. Studs with a flat front end are further known in the art. The threaded stud is welded onto a metal sheet of the body in so-called short-time arc welding. Short-time arc welding is also known as stud welding, where a metal stud (threaded stud) is positioned so as to contact the sheet metal of the body. A pilot current is then turned on and the metal stud is again slightly lifted off from the sheet metal of the body. At the same time, an arc is drawn. Then, a welding current is turned on so that the facing surfaces of metal stud and body sheet metal are fused. The metal stud is then again lowered onto the sheet metal of the body so that the melts combine. The welding current is turned off and the whole fused mass solidifies.

A lock nut is then typically screwed onto the stud, thus projecting from the sheet metal of the body. The nut acts to fix the member to the sheet metal. As a rule, the lock nut is made of synthetic material. The stud may be a coarse-pitch threaded stud or a fine-pitch threaded stud. A matching thread is provided on the lock nut. In the case of a coarse-pitch thread, it is alternatively possible that only one hole is provided on the lock nut. The coarse-pitch thread then cuts a corresponding counter-thread into the hole.

Fractures of threaded studs and of metal body sheet occur in undefined fashion. It is hard to establish what the reason for the failure was. In addition, reworking of the fractured sheet metal of a car body requires a considerably greater expenditure than reworking in the case of a fractured stud. In a fracture of the stud, a new stud can be welded at the same spot, without the strength of the sheet metal suffering.

Against this background, the problem underlying the invention is to provide an improved fastening system of generic type which, in particular, requires little reworking in the situation when the coupling of a nut to the welded stud structure fails.

SUMMARY OF THE INVENTION

To overcome the disadvantages of the fastening system mentioned, the strength of the welded joint between the structural part and the threaded stud and the strength of the stud and nut themselves are adapted to one another. Specifically, they are adapted so that upon application of a torque that exceeds that torque, which is applied per specification when the lock nut is screwed onto the threaded stud, it is ensured that the nut fractures before the stud fractures and in circumstances where the nut does not fracture, the stud fractures before the structural part fails.

This ensures that whenever too high a torque is applied to a threaded stud having a "good" welded joint, the nut or the stud, and not the structural part, fractures in every case. In this way, reworking costs due to incorrectly adjusted torque or tension wrenches or threading problems with the fastener are reduced. Even when a lock nut having too high a strength is used, it is ensured that damage of the structural part is largely ruled out when the welded joint between the stud and the part is "good."

In this regard, a "fracture" is intended to mean any damage to an element (lock nut, stud, structural part) in which a torque applied to the respective element can no longer be transmitted to a following element of the fastening chain. A fracture of the structural part generally is intended to signify that the part is structurally damaged and, in particular, that it pulls out in the region of the welded joint. In this way, the object is fully accomplished.

This embodiment has the advantage that strengthening of the structural part (sheet metal of the body of the vehicle) is unnecessary to ensure that, upon application of an excessively high torque, the stud will fracture before the part fractures.

According to another preferred embodiment, the threaded stud has a flange section that is arranged in the neighborhood of the welded joint and against which the member is screwed by the lock nut or against which the lock nut itself is screwed.

According to an additional preferred embodiment, the stud is a coarse-pitch threaded stud whose external thread, when the lock nut is screwed on, cuts a thread into its hole. According to an alternative embodiment, the threaded stud has a fine-pitch thread such as a metric thread and the lock nut has a corresponding internal thread.

In addition, it is preferable when the strength of the threaded stud and the strength of the lock nut are adapted to one another in such a way that, upon application of a torque to the lock nut that exceeds that torque which per specification is applied when the lock nut is screwed onto the threaded stud, it is ensured that the lock nut fractures before the stud fractures.

On the whole, in this way a closed process chain is obtained in which the predetermined breaking moment of the lock nut is smaller than the pre-determined breaking moment of the threaded stud, which in turn is smaller than the predetermined breaking moment of the structural part and/or of the welded joint between the structural part and the stud.

In accordance with the teachings of another embodiment, there is provided a weld stud assembly for use with a drawn arc welding system that overcomes the deficiencies of the prior art. The weld stud assembly has a head having an annular weldment area. The annular weldment area has an exterior radius which conforms to the exterior radius of the head. The annular weldment area functions to provide a weldment surface area which is about equal to the surface area from the typical circular weldment area while improving the distribution of torsional stud loads into the sheet metal.

The features mentioned above and to be explained below are usable not only in the combination indicated in each instance, but are also usable in other combinations or standing alone, without exceeding the scope of the present invention. In accordance with the teachings of the present invention, there is provided a weld stud assembly for use with a drawn arc welding system that overcomes the deficiencies of the prior art. The weld stud assembly has a head having an annular weldment area. The annular weldment area has an exterior radius which conforms to the exterior radius of the head. The annular weldment area functions to provide a weldment surface area which is about equal to the surface area from the typical circular weldment are while improving the distribution of torsional stud loads into the sheet metal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side view of the drawn arc weld stud according to the teachings of the present invention;

FIG. 2 is a bottom view of the drawn arc weld stud according to FIG. 1;

FIG. 3 is a side view of the drawn arc weld stud according to FIG. 1 being coupled to a laminate sheet;

DETAILED DESCRIPTION OF THE PREFERRED EMBODIMENTS

Figure 4:
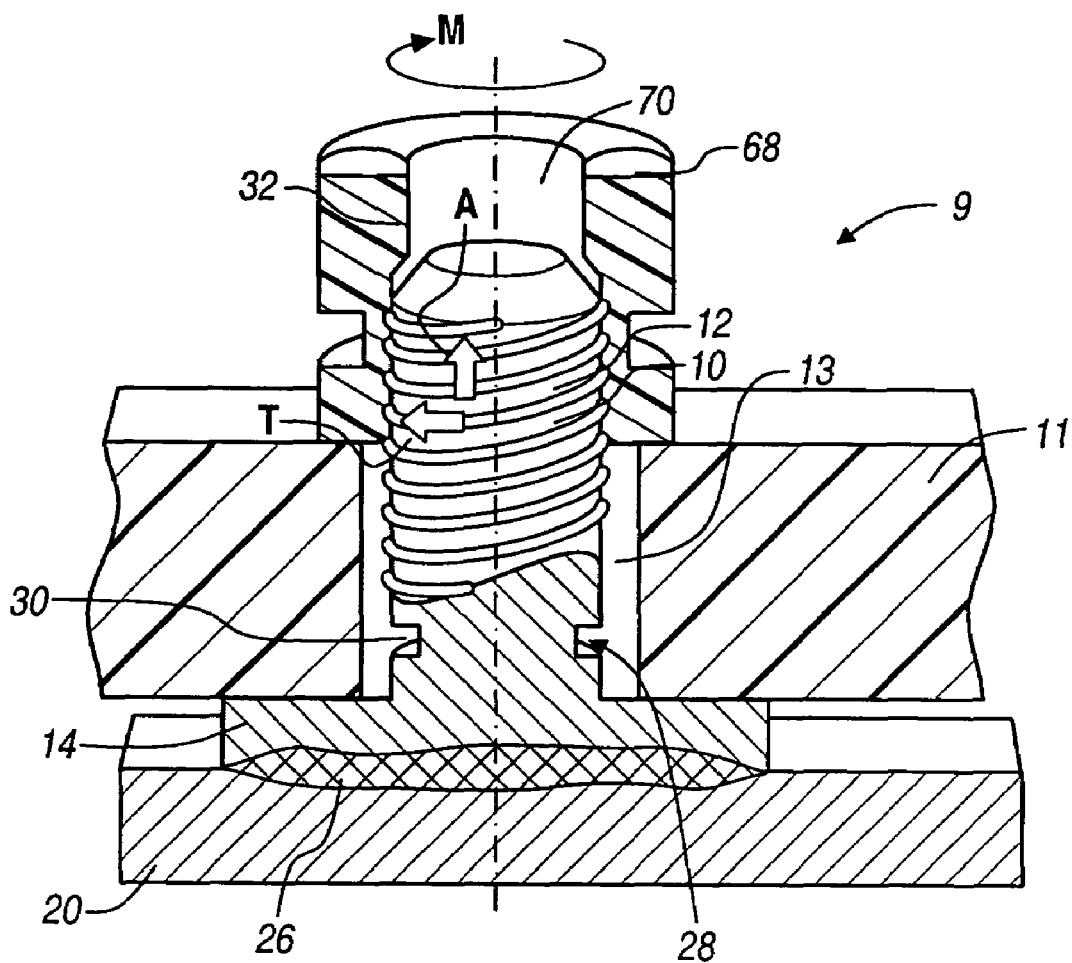
FIG. 4 is a schematic sectional view of a first embodiment of a fastening system according to the invention.

The following description of the preferred embodiment(s) is merely exemplary in nature and is in no way intended to limit the invention, its application, or uses.

FIG. 1 represents the drawn arc weld stud 10 according to the teachings of the present invention. The weld stud 10 is formed of three major components; a shank 12, a head 14, and an annular weldment portion 16. By way of non-limiting example, the shank 12 can be a M6 threaded fastener. Equally, the shank can take the form of pine-tree connector or other sized threaded fastener.

The head 14 portion is formed using cold heading methodologies. The head 14 for a M6 fastener has an exterior diameter of about 13 mm and a thickness of about 2 mm. The head further has a flat lower surface 15 having a diameter of about 13 mm. The strength of the fastener is a function of the thickness of the head. As such, as the thickness of the head is increased, generally the strength of the weld stud 10 is increased. Increasing the strength of the fastener often leads to an undesirable failure of the interface of the fastener and the laminate material. Such failures lead to the fastener being pulled out of the laminate material, leaving a hole in the thin sheet metal.

The annular weldment portion 16 has an exterior radius 18 which equals the exterior radius of the lower surface 15 of the head 14. For a M6 stud shank, the exterior radius of the head 14 is about 13 mm. The interior radius of the weldment portion 16 has a radius of about 11 mm. The resulting weldment area being about 150 mm². Each head 14 has a thickness T. The thickness 19 of the weldment portion 16 is less than 50% of the value of T and preferably approximately 20% to approximately 35% of the value of T.

In this regard, the head 14 has a web thickness 21, which is modifiable to adjust the failure mode of the fastener 10. By way of non-limiting example, a stud 10 having a web thickness 3.0 mm has a tensional failure mode at greater than 1820 lbs and a torsional failure of threads stripping at torque loads of 140 in-lbs. For studs 10 having a web thickness 21 of 2.5 mm, the tensile failure of the base material occurs at loads greater than about 1730 lbs and a torsional failure by the stripping of the fastener's threads at loads of greater than about 140 in-lbs. For studs 10 having a web thickness 21 of 2.0 mm, the stud fails in tension at loads greater than about 1700 lbs and fails in torsion with the stripping of threads at loads greater than about 135 in-lbs. For studs 10 having a web thickness 21 of 1.5 mm, the stud fails at the base material at loads of greater than 1830 lbs and by failure of the web at torsional loads of greater than 120 lbs. For studs 10 having a web thickness of 21 of 1.0 mm, the studs break in tension at the web at loads of greater than 1400 lbs and at the web at torque loads of greater than about 75 in-lbs.

As described below, it is possible to design the stud failure modes such that the shank fails at a lower torsional and tensile stress level than the web portion. Further, by modifying the web thickness 21, it is possible to set the failure mode of the web portion 21 at levels lower than the stud to weld interface, yet higher than the stud shank failure level.

By providing the annular weldment portion 16 having an outer radius equal to the exterior radius of the head 14, the heating of the base sheet metal is distributed over a greater area. Damage to the surface of the sheet metal is reduced and the strength of the weld stud 10 to surface interface is improved. As an example, interface of the M6 weld stud, according to the teachings of the present invention, can withstand a torsional load of about 400 in-lbs.

By setting the torsional fracture strength of the shank 12 to be about 80 inch pounds, the shank will always fail in torsion prior to the stud pulling off and damaging the sheet metal laminate structure, thus maintaining the integrity of the base material.

As best seen in FIG. 3, when the stud 10 is welded to the laminate sheet 20, weldment area 26 couples the stud 10 to the upper layer 23 of the laminate. During the welding process, the upper layer 23 is partially coupled to the lower layer 25 of the laminate sheet 20. The intermediate polymer layer 27 remains coupled to both the upper and lower layers 23 and 25. This intermediate polymer layer 27 functions to support the laminate structure 20. Further, it is believed that the central coupling of the laminate sheet beneath the stud and within the annular weldment, helps to distribute torsional stresses and, therefore, strengthens the torsional strength of the annular weldment joint 26. This is opposed to conventional studs which burn through or delaminate the polymer layer 27.

To exemplify the application of this invention, FIG. 3 shows a fusion connection between a stud 10 and structural sheet or laminate structure 20. The stud 10 corresponds in design to that of FIG. 1 before welding, and reference is made to the description of FIG. 1 to avoid repetition.

In use, the stud 10 of FIG. 1 is placed in contact with the laminate structure 20 with the flat edge 22 of the annular weldment portion 16 touching the laminate structure 20. A welding current is then applied. After application of the welding current, the stud 10 is withdrawn to form an arc. While the arc is burning, both the flat edge 22 of the stud 10 and parts of the structure 20 melt. After a prescribed time, the stud 10 is plunged into the molten metal. The welding current is switched off before or during plunging. Then, the weld cools down. As shown in FIG. 3, part of the circumferential edge 22 has melted. Part of the molten metal has entered the cavity 24 defined by the annular weldment area. The weld is substantially annular. The stud 10 and the structure 20 have a common weld area 26 that has set. Of course, the other illustrated embodiments of this invention operate in similar fashion.

A first embodiment of a fastening system or construction of the present invention is labeled generally 9. The fastening system 9 acts to fasten a member 11, in the case represented a part of synthetic material traversed by an aperture 13, to a structural sheet 20, in the present case the sheet metal 20 of the car body.

The fastening system 9 includes a threaded stud 10, which is welded onto the laminate or homogeneous sheet metal 20 of the car body in the stud welding process. In addition, the fastening system 9 contains a lock nut 68 made of fracturable material, which is capable of being screwed onto the stud 10.

The stud 10 contains a head 14. In the present case, a head 14 is intended to mean a section with a fairly great diameter that is preferably twice as great as the diameter of the shaft 12 of the stud 10.

The threaded stud 10 is welded in the stud welding process by the underside of its head 14 onto an upper side of the sheet metal 20. The welded joint 26 is shown schematically in FIGS. 4 and 5. On the opposing side of the head 14 there is provided the shank 12, on which is formed a coarse-pitch thread.

In the region of the transition between the coarse-pitch thread and the head 14, the threaded stud 10 in addition has a weakened section 28, which in the present case is formed by an optional peripheral groove 30. The weakened section 28 represents a predetermined breaking point of the stud, as will be explained below in detail.

The lock nut 68 has a hole 70 and the diameter of the hole 70 is adapted to the diameter of the shank 12. The coarse-pitch thread is designed as a self-cutting thread and therefore an internal thread is cut into the hole 70 when the lock nut 68 is screwed onto the stud 10. Optionally, the lock nut 68 can be a threaded metal nut which is configured to fracture at a predetermined torsional load. This fracture can occur in the threads or the body of nut 68.

As can be seen in FIG. 4, the aperture 13 of the member 11 is slipped onto the threaded stud 10. Then the lock nut 68 is screwed on, so that the member 11 is held between the upper side of the head 14 and the lower side of the lock nut 68.

Figure 5:
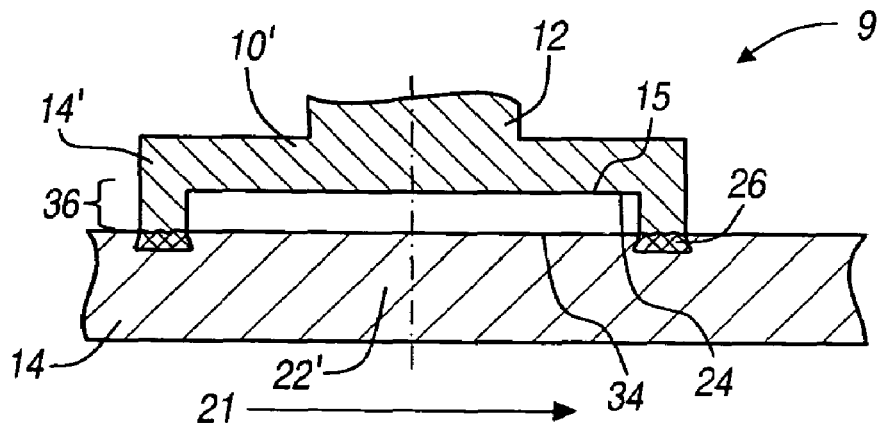
FIG. 5 is a detailed view of a modified embodiment of a fastening system, in section.

In FIG. 4, it is indicated schematically how a torque M applied to the lock nut 68 is converted in the region of the thread into an axial force A, which produces a tensile force on the stud 10, and into a tangential force T, which in turn exerts a corresponding moment on the threaded stud 10. A modification 10' of the fastening system 9 is shown in FIG. 5. In the fastening system 9, the threaded stud 10' is designed with a head 14', which lies between a shank 12' and a weldment section 26.

When a threaded stud 10' is welded onto the sheet metal of a car body 14, a welded joint 26' is produced between the flat edge 22 and the sheet metal 20. Therefore, a space 36 remains between the upper side of the sheet metal 20 and the underside of the head 14'.

The diameter of the welded section 26 is selected greater than the diameter of the shank 12'. On the whole, therefore, a welded joint 26' can be obtained with a strength that is greater than that strength which is obtainable when the diameter of the welded section 16 is equal to the—specified—diameter of the shank 12'.

Figure 6:
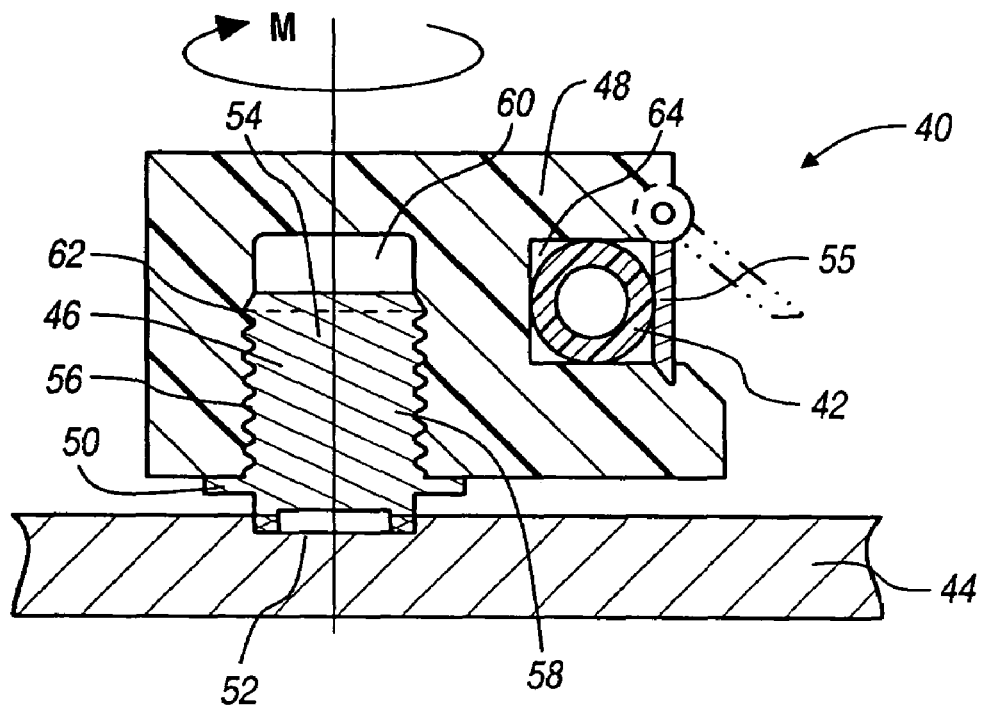
FIG. 6 is a sectional representation of an additional embodiment of a fastening system according to the invention.

FIG. 6 shows an additional embodiment of a fastening system 9. The fastening system 9 acts to fasten a member 42 in the form of a metal tube to another structural part 44, such as the sheet metal of a car body. The fastening system 9 has a threaded stud 10, which is welded by a stud-welding process to the sheet metal 44 of a car body. In addition, the fastening system 9 includes a lock nut 68 in the form of a clip of synthetic material.

The threaded stud 10 has a head 14, which corresponds to the head 14' of the fastening system 9 of FIG. 5. A welded joint between the threaded stud 10 and the sheet metal 20 of a car body is shown at 52. A shank 12 of the stud 10 is provided with a thread. The threaded stud 10 is weakened in the region of the transition between the shank 12 and the head 14, as is shown schematically at 58. In the fastening system 9, weakening is affected only in that the diameter of the shank 12 is distinctly smaller than the diameter of the head 14 and a welded section lying under the latter and not described in detail. In addition, the transition between the shank 12 and the head 14 is designed as a sharp-edged corner.

In the present case, the clip of synthetic material is screwed onto the threaded stud 10 until an underside of the clip 68 strikes an upper side of the head 14. The member 42, in the form of a metal tube, is fixed exclusively to the clip 68 of synthetic material. In the embodiment shown, a recess 64 is provided for the accommodation of the metal tube 42. In addition, the clip 68 of synthetic material has a flexibly seated locking strap 66, which is designed for the purpose of closing off the recess 64 and so accommodating the metal tube 42 form-lockingly in the clip 68.

It is understood that in all three embodiments of FIGS. 4 to 6, the threaded studs 10, and the sheet metal 20, of a car body may in each instance consist of steel or a steel alloy or of aluminum or an aluminum alloy. It is also understood that the lock nuts 68, may be made of a material other than synthetic material, provided that the strength requirements explained below with reference to FIG. 7 are met.

The member 12 may alternatively be a metal element. Correspondingly, the member 42 may alternatively be an element of synthetic material. In all three embodiments, the strengths of the separate elements are adapted to one another, as is shown schematically in FIG. 6.

Figure 7:
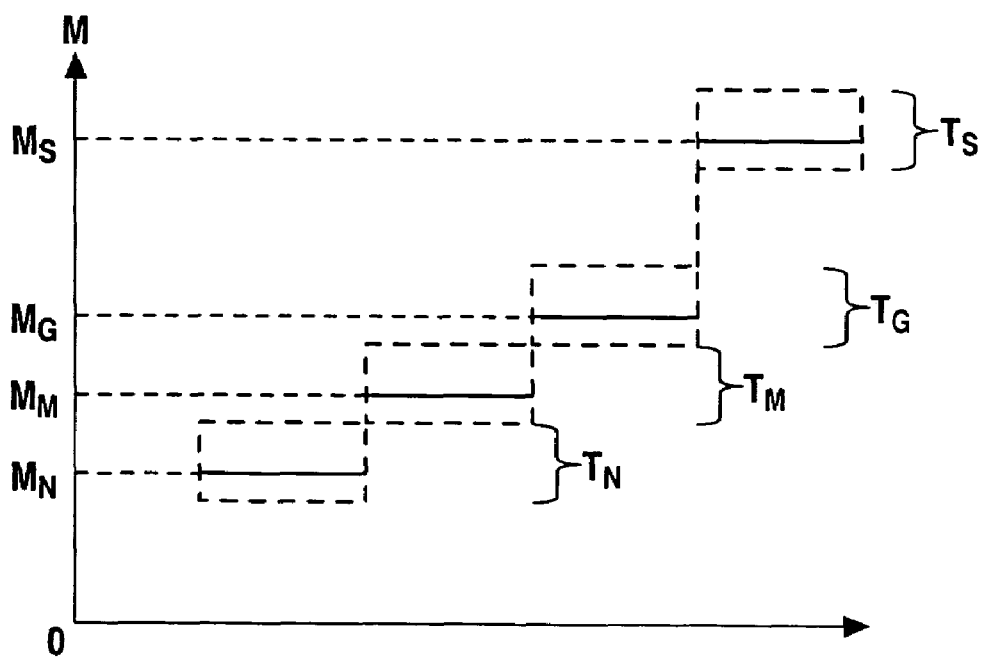
FIG. 7 is a diagram with a qualitative representation of a variety of relevant torques of the fastening system of the present invention.

A torque M, which in the representation of FIG. 7 is applied to the lock nut 68 in order to fasten the member 12 to the sheet metal of a car body, is plotted on the abscissa in FIG. 7. In order to obtain proper fastening of the member 12, the lock nut 68 is screwed on with a given rated torque $M_N$, which in FIG. 7 is represented qualitatively as greater than zero. The rated torque $M_N$ is assigned a tolerance region $T_N$, within which the rated torque $M_N$ typically applied by a torque wrench or tension wrench varies.

Upon application of the rated torque $M_N$, assuming failure-free parts and a failure-free welded joint 26, proper fastening of the member 14 is obtained. A predetermined breaking moment of the lock nut 68 is additionally shown at $M_M$ in FIG. 7. The predetermined breaking moment $M_M$ is qualitatively higher than the rated torque $M_N$. The predetermined breaking moment $M_M$ is assigned a tolerance region $T_M$, within which the lock nut 68 fractures or its thread is destroyed. At the same time, care should be taken to see that the tolerance regions $T_M$ and $T_N$ do not intersect, but preferably adjoin one another.

FIG. 7 additionally shows a predetermined breaking moment $M_G$ of the threaded stud 10. The predetermined breaking moment $M_G$ is qualitatively higher than the predetermined breaking moment $M_M$ of the lock nut 68. The predetermined breaking moment $M_G$ is assigned a tolerance region that does not intersect with the tolerance region $T_M$ of the lock nut 68, but directly adjoins it.

Lastly, a predetermined breaking moment of the welded joint 26 is shown at $M_S$ in FIG. 7. The predetermined breaking moment $M_S$ is distinctly greater than the predetermined breaking moment $M_G$ of the stud 10. The predetermined breaking moment $M_S$ of the welded joint 26 is likewise assigned a tolerance region $T_S$.

The tolerance region $T_S$ of the predetermined breaking moment $M_S$ of the welded joint 26 does not intersect with the tolerance region $T_G$ but, rather, lies at a considerable distance apart from it. It is therefore ensured that the maximum pre-determined breaking moment $M_G$ still capable of being borne by a threaded stud 10 (the upper limit of the tolerance region $T_G$) is distinctly smaller than the minimum predetermined breaking moment $M_S$, at which the welded joint 26 could fracture.

For purposes of simple representation, only one fracture of the welded joint 26 has been mentioned regarding FIG. 7. However, it is understood that this is intended to mean a fracture of the welded joint and/or of the sheet metal of a car body. This "closed process and fastening chain" of rated torque and pre-determined breaking moments ensures that, in every operating condition, the element whose replacement results in the lowest costs is the one that always fractures.

Similarly, the web thickness 21 can be adjusted so that it has a breaking moment of the web thickness 21 is between the breaking moment of the stud shank $M_g$ and the breaking moment $M_s$ of the weld joint 22. Upon failure, the annular weldment configuration leaves a fractured toroidal head portion coupled by the weldment area to the sheet metal structure.

If, when the lock nut 68 is screwed onto the member 12, too high a torque M (greater than the upper limit of the tolerance region $T_N$) is inadvertently applied, the nut fractures or its thread tears out in every case, since the pre-determined breaking moment $M_M$ of the nut is distinctly smaller than the predetermined breaking moment $M_G$ of the threaded stud 10, and because of the fact that the tolerance regions $T_M$ and $T_G$ do not intersect.

If, in the representation of FIG. 4, an incorrect lock nut 68 (a lock nut with too high a strength) has inadvertently been selected, the distinct distance apart of the tolerance regions $T_G$ and $T_M$ in every case ensures that first the stud 10 fractures (usually at its predetermined breaking point 30 or by destruction of its thread), and therefore no damage to the welded joint 26 or to the sheet metal 20 of the car body occurs.

For all sources of error that may occur in the fastening system 9, it is therefore ensured that the welded joint 26 and the sheet metal 20 of the car body are not unnecessarily damaged.

In quality control of the threaded stud 10 before the lock nut 68 is screwed on, a test moment that is equal to the predetermined breaking moment $M_M$ of the specified lock nut 68 is usually applied to the stud. A fiberglass-reinforced test nut is usually used for this purpose. If, in this testing, too high a torque is inadvertently applied, the distance between the tolerance regions $T_G$ and $T_S$ ensures that in every case the stud 10 fractures and the welded joint 26 and the sheet metal 20 of the car body are not damaged.

The above description of the various moments and the closed process chain is correspondingly applicable to the embodiments of FIGS. 5 and 6. In the case of the embodiment of FIG. 6, the clip 68 of synthetic material represents the lock nut.

It is understood that the thread match between the studs 10, and the lock nuts 68 should be selected so that, in case of destruction of the thread of the lock nuts 68, unscrewing should nevertheless be possible, so as to prevent unnecessarily high torques from being applied to the studs 10, 46 upon unscrewing. Because of the closed process chain, the lock nut 68, 18 (which usually is made of synthetic material) is the "weakest link." The next weakest link is the fastening stud 10. The welded joint 26 or 52 has the greatest strength.

It is of special advantage when the threaded stud 10 is weakened at one spot and when the weakening is designed so that the stud 10 fractures at the point of weakening before the structural part fractures in the region of the welded joint between the structural part and the stud.

The weakening may be affected in many ways, for example, by the selection of material, by the construction of the stud, etc. The case in which the thread of the stud 10 becomes unusable, i.e., is no longer able to transmit torque, should also be understood as a fracture. Alternatively, by a fracture it is to be understood that the threaded stud 10 as a whole breaks off against its foot, substantially without damaging the welded joint structurally. It is of special advantage when the stud 10 has a weakening recess, in particular a peripheral groove.

Such a weakening recess makes it possible to ensure, in structurally simple fashion, that according to the invention first the stud 10 fractures before the structural part fractures when an excessive torque is applied. The weakening recess may be produced by for example machining.

Figure 8:
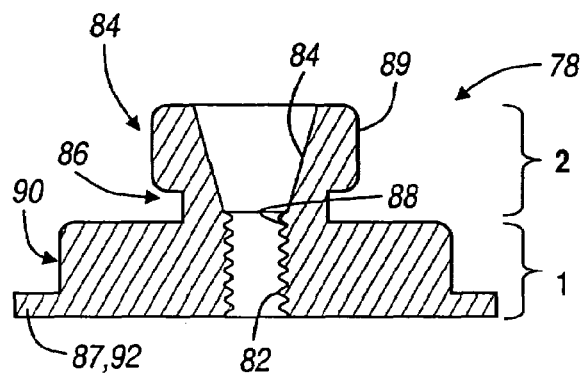
FIGS. 8 and 9 are cross-sectional views of a frangible nut according to the teachings of the present invention.

FIG. 8 shows the nut 68 according to the invention for limiting an acting torque, having a threaded section 82 and a funnel-shaped tubular section 84 in the side view. A predetermined breaking point 86, which is designed as a clearance or constriction, is arranged between the threaded section 82 and the tubular section 84. In other words, the predetermined breaking point 86 has an outside diameter that is smaller than the outside diameter or an outside dimension of the threaded section 82 as well as smaller than the outside diameter or an outside dimension of the tubular section 84. The latter may be designed for example funnel-shaped in such a way that, starting from an outside or nominal diameter of an internal thread 88 of the threaded section 82, it widens [in direction] away from the latter.

Figure 9:
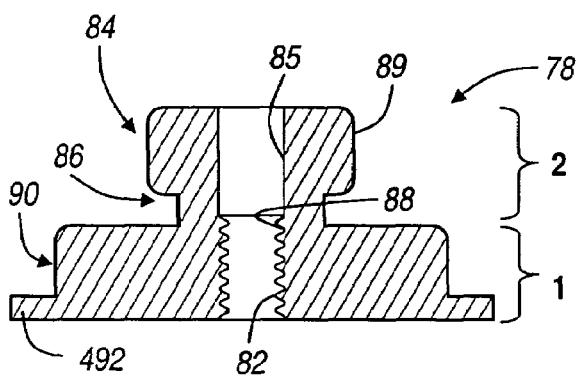
Figure 10:
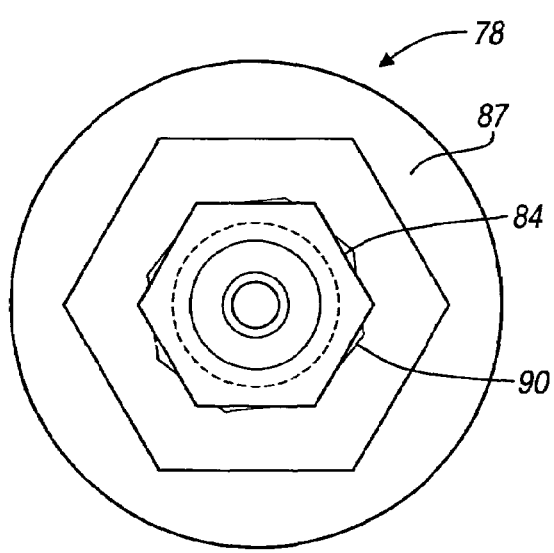
FIGS. 10 and 11 are side views of alternate lock nuts.

Alternate to the funnel-shaped design of the tubular section 84 shown in FIG. 9 is the cylindrical design shown in FIG. 10. Such a cylindrically designed tubular section 85 then advantageously has a greater diameter than the outside or nominal diameter of the internal thread 88 of the threaded section 82.

The two embodiments described (funnel-shaped or cylindrical) advantageously help to minimize the problem described at the beginning, that in the case of strong friction in the upper part of the internal thread 88, perhaps in a stud 10 (not illustrated) projecting into the tubular section 84, the predetermined breaking point 86 does not come to bear at all, because the introduction of force does not take place only via this joint but also via the stud 10 end.

As can be seen in FIGS. 9 or 10, at least the tubular section 84 has a second shoulder structure 90 for a tool, in the simplest case an open-end wrench or comparable outside tool. A third shoulder structure 92 for an inside tool advantageously is designed in the tubular section 84, for example, as a square or hexagon or the like. In particular, for the purpose of disassembly of an assembled screw nut 94, it has in the region of the threaded section 82 a first shoulder structure 89 for an additional tool, advantageously again an outside tool.

Figure 11:
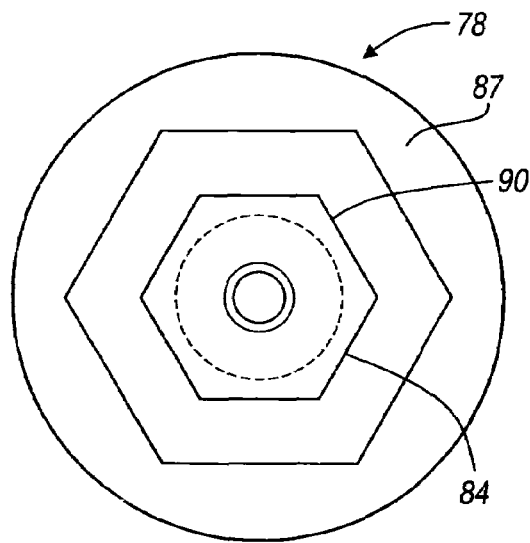

FIG. 11 shows the lock nut 68 of FIGS. 9 or 10 in top view with a first 89 and a second 90 shoulder structure of like dimensions. An optionally provided flange 87, for example, advantageously improves the seating or tightness of a structural part (not illustrated) in the region of the screw nut 94. In addition, such the lock nut 68 prevents a stud 10 cooperating with it, for instance, from being torn out of a metal sheet.

According to the invention, the lock nut 68 preferably has first and second shoulder structures 89, 90 of unlike dimensions, as is illustrated in FIG. 6. Accordingly, the first shoulder structure 89 may, for example, have a greater dimension than the second shoulder structure 90, in particular—as shown—not comparable, i.e., incommensurable, polygons.

The screw nut 84 according to the invention preferably consists of a synthetic material, in particular of a polymer such as polyamide. This has the advantage that particularly the region of the predetermined breaking point 86 may consist of a material differing from the threaded section 82 and/or the tubular section 84, in particular a softer material, i.e., a defined torque limitation is obtainable not only via the geometry of the predetermined breaking point 86 but also or exclusively via selectively processed material of suitable quality.

Figure 12:
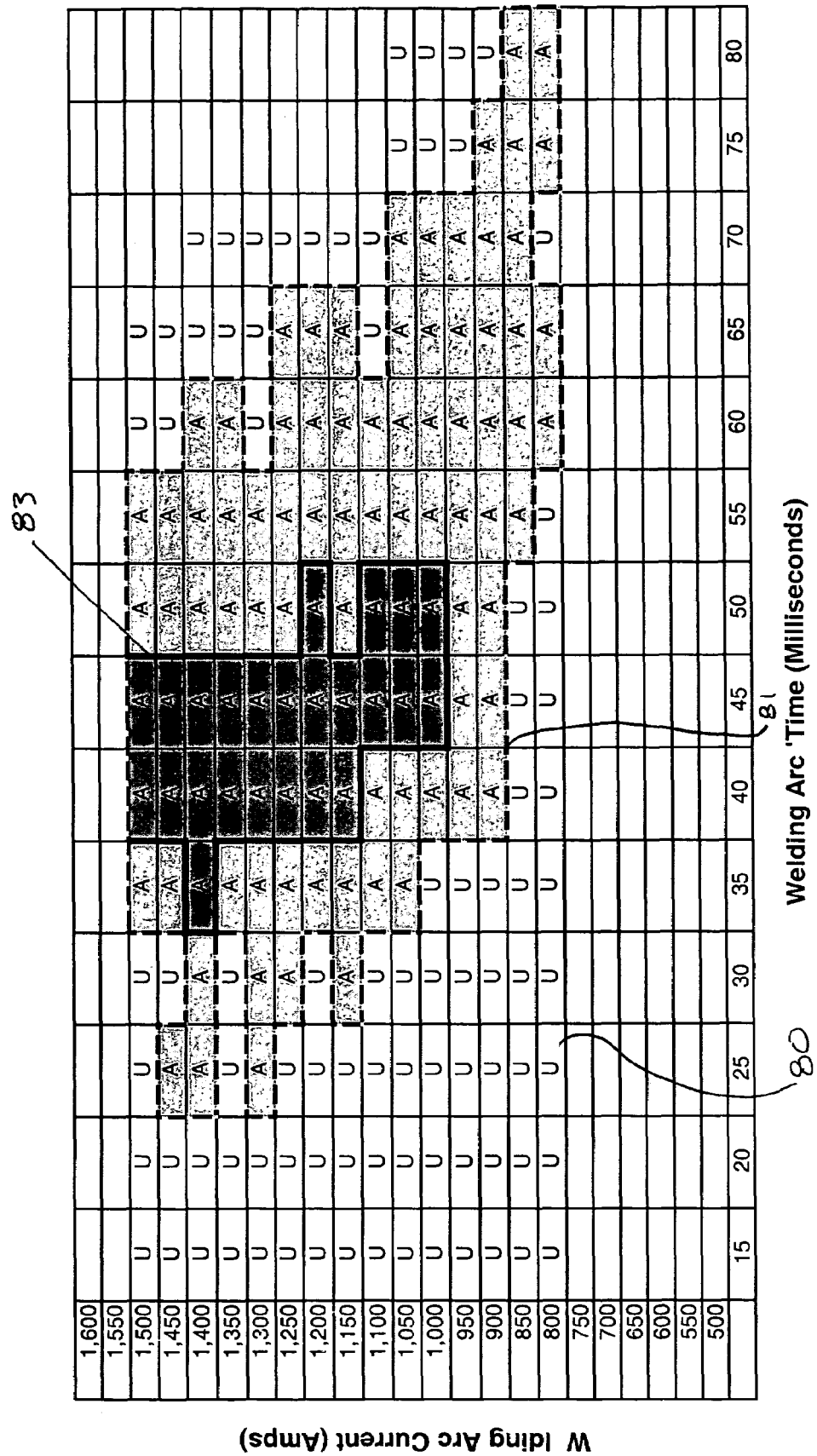
FIG. 12 represents a chart describing welding parameters according to the teachings of the present invention.

FIG. 12 represents a chart describing weld parameters according to the teachings of the present invention. Shown is a chart representing welding arc current in amps vs welding arc time having three specific areas. An acceptable welded area is defined by greater than 90% of the studs failing by stud failure rather than a failure of the weldment area 16 when the stud is placed under loaded conditions. The first area 80 is of unacceptable welds for both prior art studs and the studs 10 according to the teachings of the present invention (labeled as U). Also shown is an area 81 enclosed by a dashed line which represent acceptable welds for the studs 10 according to the teachings of the present invention (labeled as A). Shown is a third area 83 encompassed by a solid line which represents the acceptable weld area for prior art studs as well as the studs 10 of the present invention.

As can be seen by the chart, the studs 10 of the present invention represent a significant improvement in weld processes. By increasing the ranges of acceptable welding parameters, automated welding processes can be significantly improved and made less expensive. The chart shows that acceptable welds using the studs 10 are available for welding arc times greater than 50 msec and weld arc currents of less than 150 amps when the stud is being fastened to thin sheet metal. Laminates having a metal thickness of equal to or less than 0.90 mm were used in the formation of the chart.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A weldable fastener for welding to a metal surface comprising:
    a fastener head having a first head thickness between a head top surface and head bottom surface;
    an externally threaded shank disposed on the top surface; and
    an annular weldment area disposed on the bottom surface having a second head thickness between the head bottom surface and a flat annular weldment surface, said second head thickness being between about 20% to about 35% of the first head thickness, wherein said annular weldment area, said bottom surface, and metal surface define a non-welded cavity upon welding of said annular weldment area to the metal surface.

2. The weldable fastener according to claim 1 wherein said head has an exterior wall having a first exterior radius and said annular weldment area has a second exterior radius equal to the first exterior radius.

3. The weldable fastener according to claim 1 wherein said shank comprises a weakened section position adjacent to said head.

4. The weldable fastener according to claim 1 wherein the first head thickness is greater than 1.5 mm.

5. The weldable fastener according to claim 1 wherein the first head thickness is greater than 2.0 mm.

6. A weld fastener for welding to a metal surface comprising:
    a longitudinally elongated shank;
    a laterally enlarged head extending from an end of the shank having a head thickness; and a substantially annular weldment section longitudinally extending from the head opposite the shank, said annular section having a thickness which is 20% to 35% of the head thickness;

wherein a welding surface of the annular section is substantially flat along a lateral plane substantially parallel to a lateral plane of the head, prior to welding, and wherein said annular weldment section defines a circular non-welded cavity between the metal surface and the head upon welding of the annular section to the metal surface.

7. The weldable fastener according to claim 6 wherein said head has an exterior wall having a first exterior radius and said annular weldment area has a second exterior radius equal to the first exterior radius.

8. The weldable fastener according to claim 6 wherein the elongated shank is an externally threaded shank.

9. The weldable fastener according to claim 6 wherein said shank comprises a weakened section portion adjacent to said head.

10. The weldable fastener according to claim 6 wherein the first thickness is greater than 1.5 mm.

11. The weldable fastener according to claim 6 wherein the first thickness is greater than 2.0 mm.

* * * * *